United States Patent [19]
Marangoni

[11] 3,986,916
[45] Oct. 19, 1976

[54] DOUBLE SEALED CHAMBER MOULD FOR CURING COVERED PNEUMATIC TIRES

[76] Inventor: Carlo Marangoni, Via Bellavista 22 Roverto (Trento), Italy

[22] Filed: May 8, 1975

[21] Appl. No.: 575,632

[30] Foreign Application Priority Data

May 14, 1974 Italy ............................... 22671/74
Apr. 7, 1975 Italy ............................... 22054/75

[52] U.S. Cl. ............................... 156/394; 425/18; 425/34 R
[51] Int. Cl. ........................... B29h 5/04; B29h 5/16
[58] Field of Search .................. 425/14, 17, 18, 19, 425/20, 23, 34, 35, 28 R; 156/96, 394

[56] References Cited
UNITED STATES PATENTS

| | | | |
|---|---|---|---|
| 1,643,869 | 9/1927 | Barrè ............................... | 425/23 |
| 1,871,118 | 8/1932 | Denmire ............................ | 425/34 |
| 2,227,798 | 1/1941 | Rihn et al. ........................ | 425/18 |
| 2,902,717 | 9/1959 | Duerksen .......................... | 425/19 |
| 3,236,709 | 2/1966 | Carver ............................. | 156/96 |
| 3,886,028 | 5/1975 | Hindin et al. ..................... | 156/96 X |
| 3,926,711 | 12/1975 | Wolfe ............................. | 156/96 X |

FOREIGN PATENTS OR APPLICATIONS 740,860   11/1955   United Kingdom .................. 425/19

OTHER PUBLICATIONS

The James Co. Heintz Co. Brochure Article, "Matri--Chamber Schematic", James C. Heintz Co., Cleveland, Ohio, First Page of 8 Pages of Copies in Class 156, Subclass 394 FM Printed on Date of Sept. 1, 1972.

*Primary Examiner*—J. Howard Flint, Jr.
*Attorney, Agent, or Firm*—Michael J. Striker

[57] ABSTRACT

A mould for curing covered pneumatic tires, includes a tubular drum, provided with an intermediate partition wall subdividing the interior of the drum into two chambers having annular configurations which are internally bounded by a tubular member having axial length substantially equal to that of the drum, each of the chambers being closed by a door hinged to said drum and having an annular interior recess configuration.

20 Claims, 11 Drawing Figures

DOUBLE SEALED CHAMBER MOULD FOR CURING COVERED PNEUMATIC TIRES

This invention relates to a double sealed chamber mould for curing covered pneumatic tyres. As well known, worn out pneumatic tyres, especially if of large mass, may be advantageously re-used by the application on their carcasses of a pre-molded ring, constituting a tyre tread.

The thus renewed pneumatic types require, as well known, a final curing treatment, adapted to set the bond between the tyre tread and the tyre carcass. Such treatment is put into effect by subjecting the respective tyres part of the pneumatic tyre to a heating action and possibly a simultaneous compression with the use of suitable fluids. In practice, the pneumatic tyre is inserted into a sealed chamber in which a fluid is caused to circulate the temperature and pressure of which are dependent on one another.

The outcome of such treatment depends in fact on a correct choice of the pressure and temperature to which the tread band is subjected.

At present, hermetically sealed chambers are used for such treatment, which may be generally designated as steam-heated hydraulic presses or autoclaves with direct steam or warm air pressure, and they are constructed as to constitute simple containers.

Consequently, the introduction of the pneumatic tyre into the chambers requires particular arrangements which provide an adequate support to the pneumatic tyre. More in detail, in view of the need to proceed with inflating the pneumatic tyre, it is necessary to mount the latter on a rim provided with suitable proper retaining beads.

The pneumatic type itself undergoes further, in the traditional type equipment the same treatment at its entire surface. This is counter productive insofar as integrity of the carcass is concerned as a result of the tensions likely to develop between the plies constituting the core.

Furthermore, the lack of adequate protection may result in the heating fluid penetrating between the tread ring and the underlying carcass, and just the same occurs in in the curing process of the adhesive layers.

A further inconvenience inherent to the traditional type equipment is that large quantities of heating fluid are required and that heat exchange with the outside takes place at the entire surface of the treatment chamber.

It is an object of this invention to provide a curing mould not having the above-outlined drawbacks. It is another object of this invention to provide a curing mould in which the temperature to which the tread band and partially the underlying carcass is subjected is substantially uniform along the entire tread band.

It is still another object of this invention to provide a curing mould which reduces expenses in energy, space and material requirement terms.

It is a further object of this invention to provide a curing mould allowing to proide a suitable pressure differential between the internal and external part of the pneumatic tyres. These and further objects which will become more apparent from the following detailed description are attained with the use of a double chamber curing mould of this invention.

The curing mould generally consists of a horizontal axis drum, provided with a partition wall splitting it into two open cylindrical chambers, each having annular configuration.

The chambers may be closed by two tight closure doors, hinged to the drum and also having annular shapes, each having an annular projection for the support of covered pneumatic tyres.

The curing mould is further internally so structurally built as to receive therein and to lock one or more pneumatic tyres of various dimensions, due to the use of properly shaped interchangeable discs or beads. The beads embrace the central portion of a pneumatic tyre, leaving free only the peripheral portion thereof on which there is fitted the band with the new tyre tread.

As a result of this arrangement, besides simplifying the insertion operations of the pneumatic tyres into the mould, the free space inside the curing mould is considerably reduced with a consequent smaller consumption of the heating fluid. The presence of the aforesaid beads prevents or at least minimizes the possibility of heating the flanks of the pneumatic tyres, thereby protecting the reinforcing plies thereof from harmful heat tensions.

In this connection, it is to be mentioned that each of the beads referred to above may be provided with a proper inner cooling circuit.

Alternatively, the protection of the flanks of the pneumatic tyres may be provided by using a double shoulder member hinged to the drum and located between the drum and each of the two doors. The peripheral covered portion of the pneumatic tyre is preferably protected by means of a diaphragm the edges of which are locked by the beads so as to avoid the possibility of the heating fluid coming in contact with the parts subjected to the curing process.

The diaphragm is further provided with a duct, adapted to discharge to the outside any air which is present between the diaphragm and the covering in order to improve the adhesion between the parts which are in contact with each other. Obviously, the curing of pneumatic tyres can be performed also without the diaphragm and/or beads.

The double sealed chamber curing mould of this invention is further provided with a set of interdependent valves, adapted to automatically differentiate the pressure between the interior and the exterior of the pneumatic tyres.

The mould of this invention includes further a fan, adapted to maintain the heating fluid in motion in order to make the temperature uniform over the entire surface of the tread ring subjected to the curing process.

These and further characteristic features of a functional and constructional nature of the double sealed chamber mould for curing covered pneumatic tyres of this invention will be better understood from the following detailed description taken in conjunction with the figures on the accompanying drawings, representing some preferred, but non-limiting embodiment forms of this invention, in which.

Figure 1:
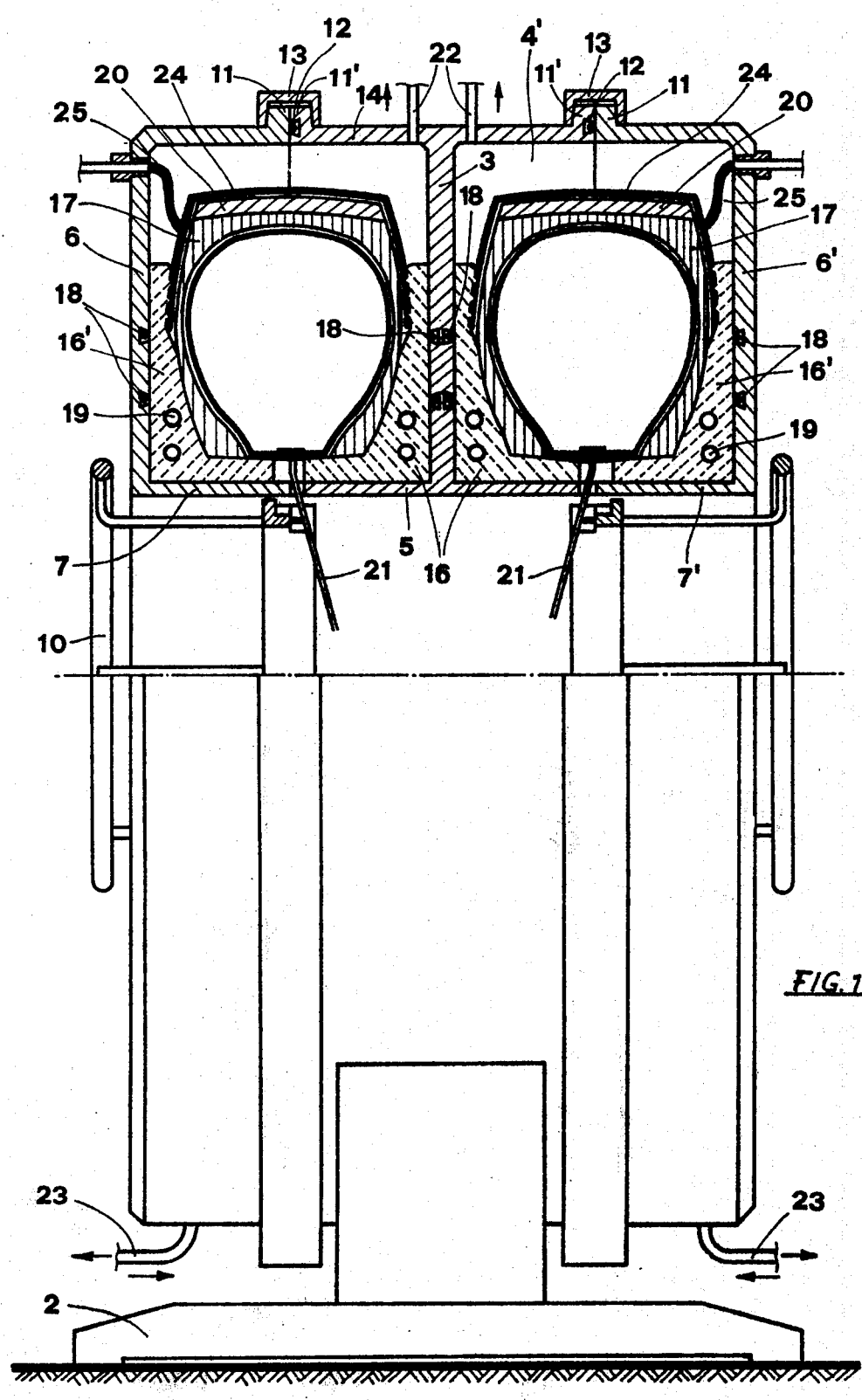
FIG. 1 shows in a schematic view a partial cross section of a double sealed chamber curing mould of this invention.
Figures 2, 3, 4:
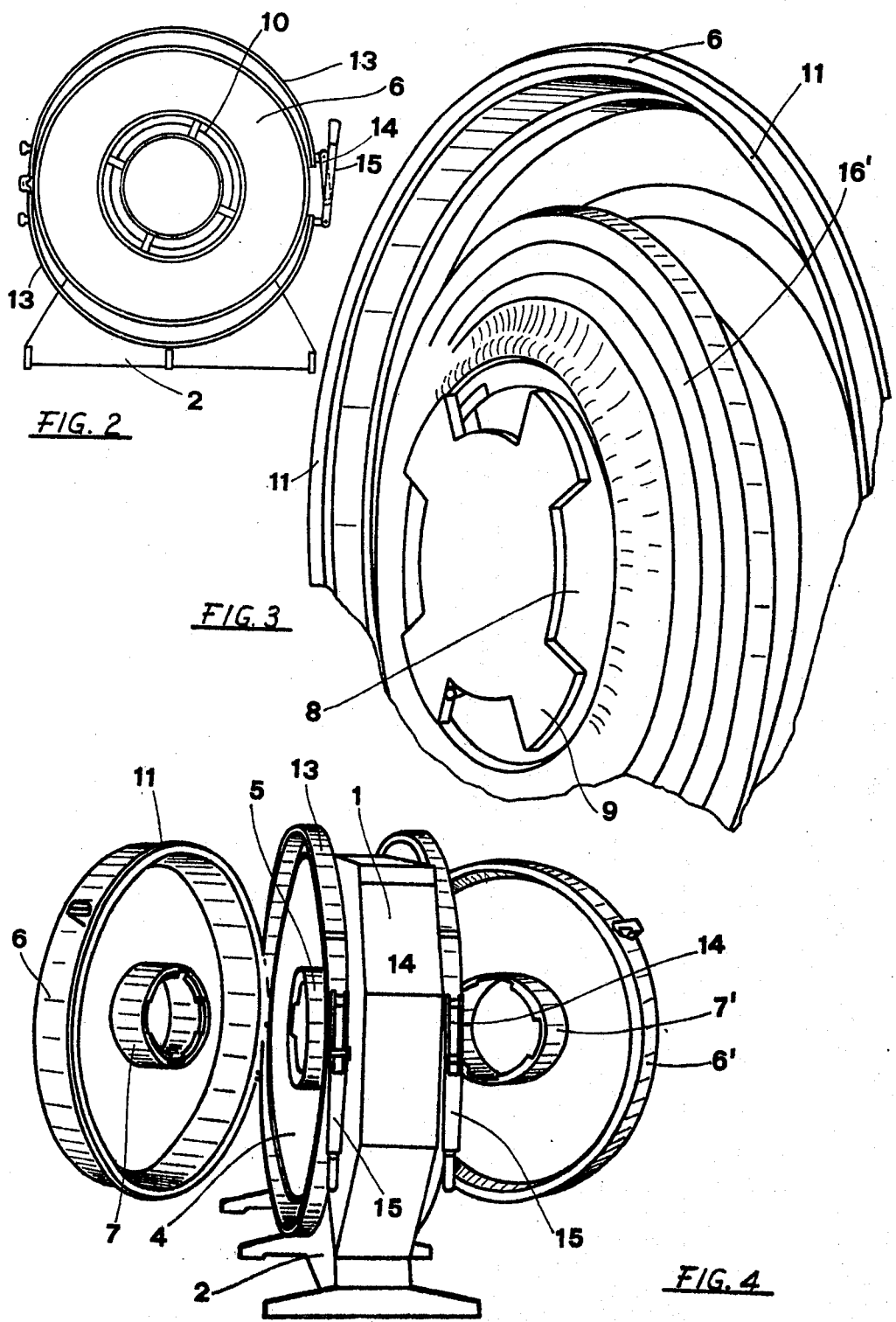
FIG. 2 represents a perspective front view of the same curing mould as above.
FIG. 3 shows the perspective partial view of a door and a head.
FIG. 4 shows the curing mould of this invention in a perspective side view with both doors open.
Figure 5:
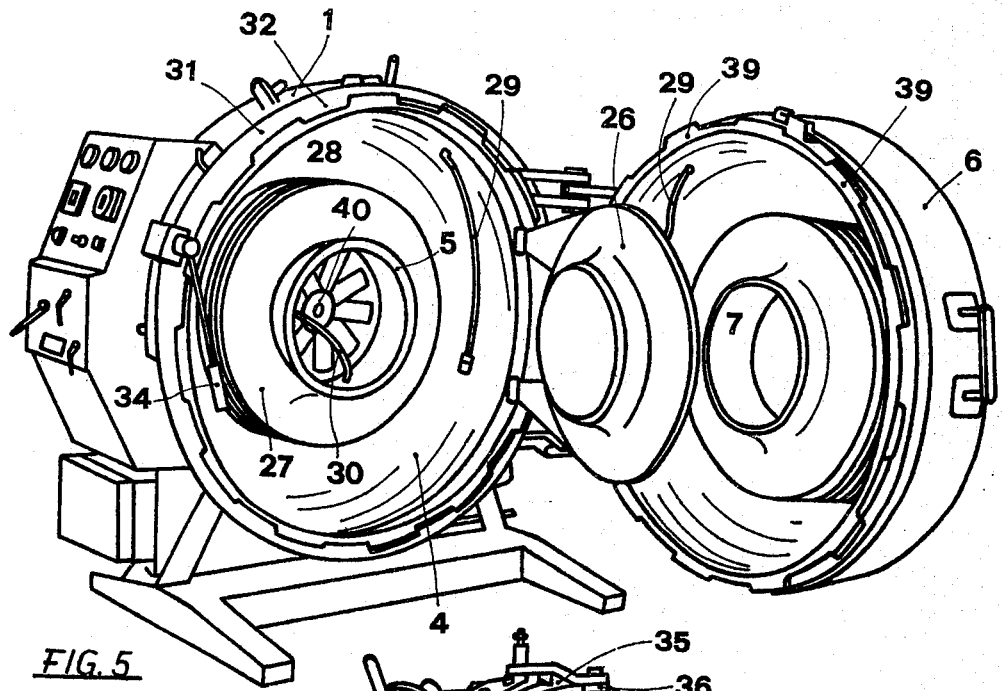
FIG. 5 represents in a perspective side view one of the two chambers of the curing mould according to this invention, in open position, and provided with a control board.
Figure 6:
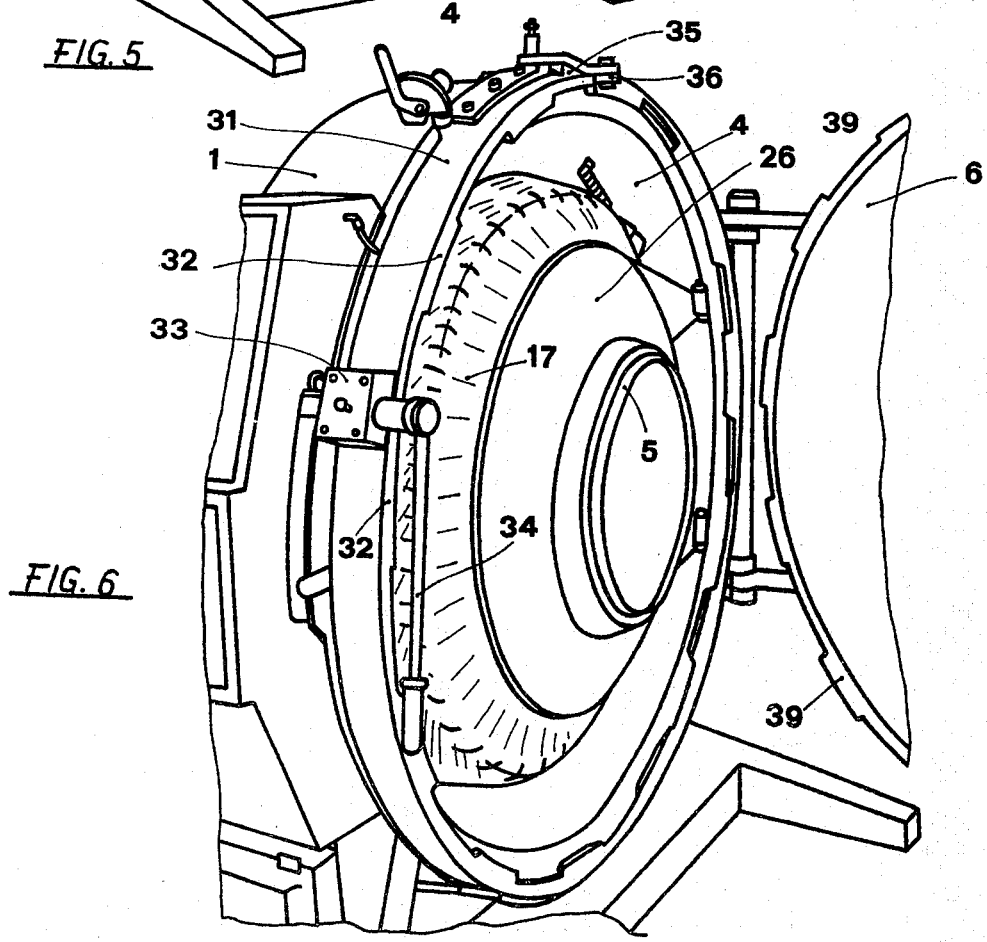
FIG. 6 shows in a perspective schematic view the arrangement of a pneumatic tyre in the interior of the chamber illustrated in FIG. 5.
Figure 7:
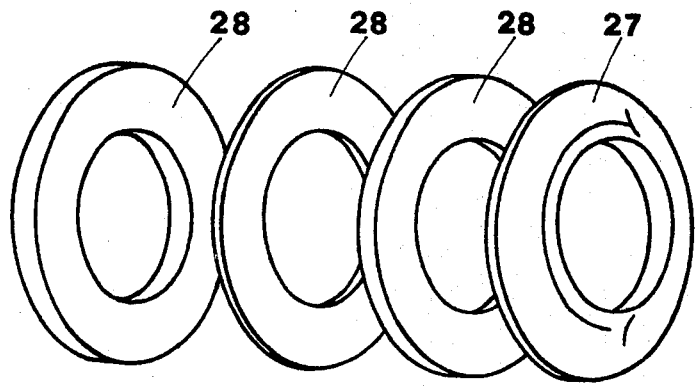
FIG. 7 represents in a perspective view annular members of different thickness to be used for the correct positioning of the pneumatic tyres as a function of their section, inside the chamber illustrated in FIG. 5.
Figure 8:
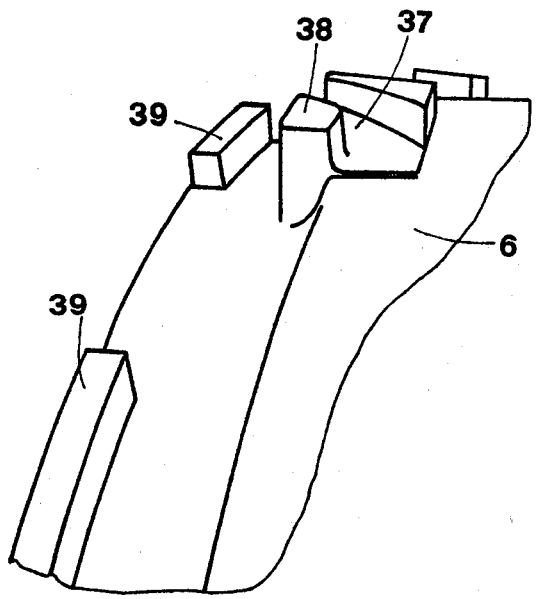
FIG. 8 shows in a schematic form a portion of the door of the chamber depicted in FIG. 5.

Referring now particularly to the embodiment illustrated in FIGS. 1–4 of the accompanying drawings, the double sealed chamber curing mould according to this invention consists of a drum 1 having preferably a horizontal axis, which is mounted on a base 2 and is provided with an intermediate partition wall 3, adapted to split the interior of the drum 1 into two open cylindrical chambers 4 and 4'.

Each of the chambers, more in detail, has an annular shape and is internally bounded by a tubular member 5 having a suitable diameter and axial length almost equal to that of the drum 1.

Peripherally of the latter there are hinged two doors 6 and 6', which are also internally annularly shaped, each being bounded by an annular coaxial projection 7 and 7'.

The doors 6 and 6' are provided further at their central opening with a cylindrical body 7 having radial projections 9. The cylindrical body 7 may be rotated from the outside by means of a handwheel 10 and serves the purpose of locking the doors 6 and 6' to the drum 1 due to gripping action between the radial projection 9 and cooperating projections formed perimetrally and internally of the tubular member 5. The edges 11 and 11' of the drum 1 and doors 6 and 6' are raised and provided with suitable seals 12.

The edges 11 and 11' are brought close to each other are locked by an U-shaped member 13 having two parts each having a semicircular shape, the parts being articulated at one end and coupled at the other end through a tierod 14 which can be operated by means of a lever 15.

Over the tubular member 5 and the annular projections 7 and 7' there are fitted two pairs of beads 16 and 16', respectively, consisting essentially of shaped disclike bodies. More in detail, the individual parts 16 and 16' of the 16 and 16' beads delimit annular spaces having an approximately frustoconical cross-section, which may embrace the flanks of a pneumatic tyre 17.

The shaped faces of the beads 16 and 16' have a plurality of step-like members, which ensure convenient tightness on the walls of the pneumatic tyre. Between the face of the beads 16 and 16' and the walls of the partition 3 and the doors 6 and 6', there are placed proper seals 18.

Within the beads 16 and 16' there may be formed ducts 19 of a water cooling circuit, adapted to prevent excessive heating of the flanks of the pneumatic tyre 17 on the perimetral portion of which there is glued the tread band 20.

A duct 21 passing between the pairs of beads 16 and 16' and communicating with a compression equipment also commuicates with the interior of the tyre 17.

In the two chambers 4 and 4' bounded by the drum 1 and the walls of the doors 6 and 6', there is caused to circulate through the discharge and admission holes 22 and 23, respectively, a heating fluid at a suitable temperature and pressure, controlled from case to case as a function of the operational requirements and conveniences.

The portion in plastic condition to be cured which is located between the tread band 20 and the carcass 17, is preferably protected from the direct contact with the heating fluid by means of an elastic diaphragm 24.

The elastic diaphragm 24 is provided with a duct 25, adapted to effect the discharge of air possibly present between the diaphragm 24 and the pneumatic tyre 17.

As previously set out in FIGS. 5 to 11 there is illustrated another embodiment of a double sealed chamber curing mould of this invention in which each chamber 4 is so structurally built as to allow the simultaneous curing of two or more pneumatic tyres fitted into the tubular member 5.

To effect this, the depth of the drum 1 and related tubular member 5 is chosen in dependence on the dimensions of the pneumatic tyres to be inserted into such tubular member. The door 6, on the other hand is so dimensioned as to ensure the accommodation therein of one pneumatic tyre only.

On the edge of the drum 1 there is hinged a disc-like structure 26 having on both sides the configuration of a shoulder, adapted to support the flanks of a pair of pneumatic tyres brought close to each other.

The other flank of the pneumatic tyres is supported by means of a drilled disc 27, shaped like a shoulder and fitted over the tubular members 5 and 7. The correct positioning of such drilled discs on the tubular members 5 and 7 referred to above, depending on the side of the pneumatic tyres 17 to be treated, is obtained by placing before-hand on the tubular members 5 and 7 themselves interchangeable annular structures 28 differing from each other in thickness.

Inside the space bounded by the drum 1, the bead 6 and tubular members 5 and 7, there are provided ducts which via the hoses 29 and 30 communicate with the interiors and exteriors of the pneumatic tyres so as to inflate the same and create a controlled pressure about the pneumatic tyres.

The inflation and the creation of a suitable prssure is obtained by means of a set of (not shown) interdependent pressure controllers which are controlled by a precalibrated differential valve.

The interior of the hollow bodies 1 and 6 communicates with a duct 25 (see FIG. 1) which passes through an elastic diaphragm 24, disposed peripherally of the pneumatic tyres and which effects air discharge, should air be present between the diaphragm and the pneumatic tyre. With the drum 1 there is coupled a circular crown 31, provided with a plurality of radial projections 32 and mounted for clockwise and counter-clockwise rotation relative to the drum as a result of the action of a pawl and ratchet system 33, controlled by a lever 34.

On the same circular crown 31 there is fastened a centilevered bar 35, carrying a small wheel 36. The latter in partially open position of the door 6 fits into a shaped guide 37 formed on the edge of the door 6.

Figure 9:
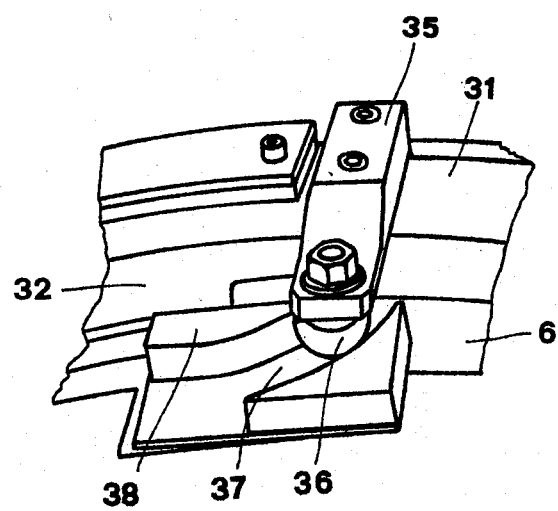
FIGS. 9 and 10 represent in a schematic view the coupling between the door and the chamber illustrated in FIG. 5.
Figure 10:
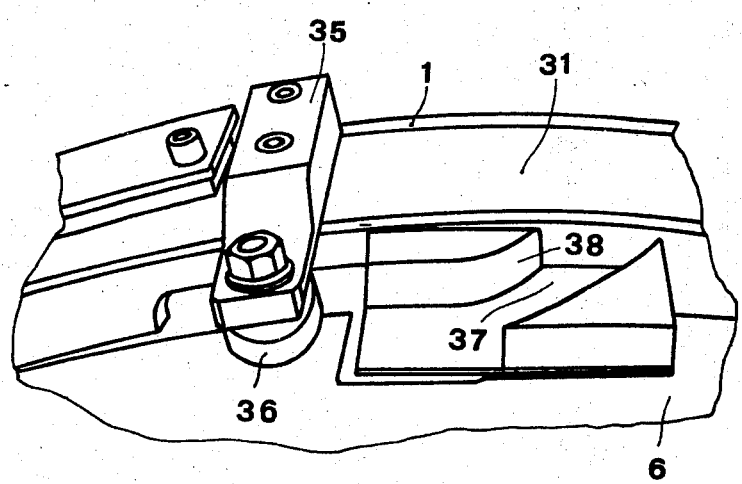
Figure 11:
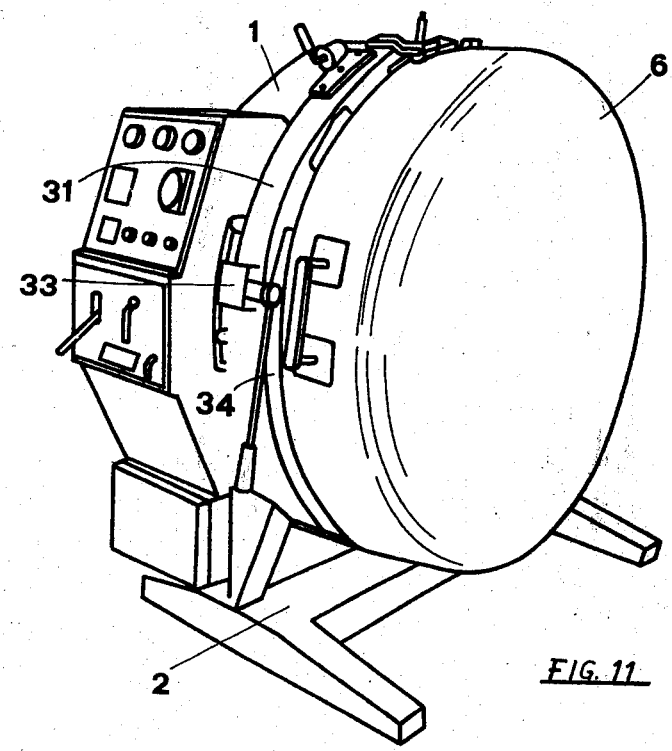
FIG. 11 shows in a perspective side view the double sealed chamber curing mould of this invention the chambers of which are those illustrated in FIG. 5.

The guide 37 diverges relative to the edge of the door 6 so as to compel the latter to tighten into the drum 1 as a result of the force resulting from the engagement of the small wheel 36 with the wedge-shaped portion 38 of guide (FIGS. 9 and 10).

On the edge of the door 6 there is further formed a plurality of projections 39 having an alternate disposition relative to projections 32 formed on the circular crown 31. The projections 39 are consequently engaged by the corresponding projections 32 upon the rotation of the aforesaid circular crown, thereby obtaining hermetic closure of the two autoclave parts which are provided with suitable delivery ducts of the heating and cooling fluids as describe above.

At the internal end of the tubular member 5 there may be placed a fan 40 for maintaining continuous air circulation inside the tubular member. From the foregoing description and from perusal of the various figures on the accompanying drawings one may easily see the functional character and practical application characterizing the double sealed chamber autoclave for curing covered pneumatic tyres according to this invention. Obviously, several changes and modifications may be introduced in this invention when putting it into effect, without departing from the very spirit and scope of this invention.

I claim:

1. A mold for curing retreaded tires, comprising a tubular drum having an axis and axially spaced ends; an inner tubular member substantially coextensive and coaxial with said tubular drum, the former and the latter circumferentially bounding an annular space; a partition extending substantially normal to said axis intermediate said ends between said tubular drum and said tubular member and subdividing said space into two annular compartments; and a pair of doors, each mounted at one of said ends of said tubular drum for movement between a closed and an open position and each axially bounding a curing chamber including the respective compartment, each of said curing chambers being adapted to receive at least one retreaded tire to be cured therein.

2. A mold as defined in claim 1, wherein each of said doors is provided with an annular recess coaxial with said tubular drum when said door is in said closed position thereof; and wherein the respective curing chamber includes the respective recess in addition to the respective compartment.

3. A mold as defined in claim 1, and further including a pair of hinges each mounting one of said doors at the respective end of said drum.

4. A mold as defined in claim 1, and further comprising means for locking said doors in their closed positions, said locking means including at least one projection on said tubular member extending substantially radially inwardly therefrom, and a locking member mounted centrally of the respective door for rotation and having at least one radially outwardly projecting portion adapted to engage behind said projection when said door is in said closed position thereof.

5. A mold as defined in claim 1, wherein coextensive annular shoulders are provided at said ends of said tubular drum and at said doors; and further including means for locking said doors in said closed positions thereof, said locking means engaging said shoulders to lock said doors in said closed positions.

6. A mold as defined in claim 5, wherein said locking means includes a pair of semi-annular locking elements for each of said doors, each of said locking elements having a U-shaped cross section and being adapted to receive said shoulders.

7. A mold as defined in claim 6, said locking means further including a pivot for articulating said locking elements of each pair; and a tying rod for drawing said locking elements towards one another so that they receive said shoulders.

8. A mold as defined in claim 1, and further comprising a plurality of beads in each of said curing chambers, said beads of annular configurations and having contact surfaces adapted to contact respective flanks of a retreaded tire to be cured to protect the same from excessive heating during the curing operation.

9. A mold as defined in claim 8, and further comprising means for cooling the flanks of a respective tire, said cooling means including at least one cooling duct in each of said beads.

10. A mold as defined in claim 1, and further comprising means for inflating the retreaded tire to be cured and including a source of pressurized medium, and a duct communicating said source with the interior of the tire.

11. A mold as defined in claim 1, and further comprising means for heating and pressing the tread against a peripheral portion of the tire so as to cure the bond between the former and the latter, said heating and pressing means comprising a source of heated and pressurized medium, and means communicating said source with said curing chambers.

12. A mold as defined in claim 11, and further comprising a diaphragm in each of said curing chambers and overlying the tread and the tire so as to prevent direct contact of the same with said heated and pressurized medium.

13. A mold as defined in claim 12, and further comprising conduit passing through said diaphragm and communicating with the ambient atmospherre for discharging air present between said diaphragm and the retreaded tire to be cured.

14. A mold as defined in claim 1, and further comprising locking means for said doors, said locking means including a locking ring mounted on said tubular drum for rotation with respect thereto about said axis, at least one follower on said locking ring and including a projection and a roller mounted on said projection for rotation, and at least one cam member at the peripheral edge of each of said doors, said cam member having a cam surface with which said roller cooperates when said door moves towards said closed position thereof so as to tightly close said curing chamber.

15. A mold as defined in claim 14, and further comprising means for rotating said locking ring and including a ratchet and pawl arrangement, and an actuating lever.

16. A mold as defined in claim 14, wherein said locking means further includes at least one radially inwardly extending projection on said locking ring, and at least one radially outwardly extending projection on said door; and wherein said projections engage one behind the other during the rotation of said locking ring.

17. A mold as defined in claim 1, and further including means for cooling the mold, said cooling means including a blower accommodated within said inner tubular member.

18. A mold as defined in claim 2, wherein said compartment is dimensioned to receive at least one retreaded tire; and wherein said recess is dimensioned to receive only one retreaded tire.

19. A mold as defined in claim 18, and further comprising at least one disk in each of said curing chambers and having two opposite support surfaces adapted to contact the flanks of two adjacent tires to be cured.

20. A mold as defined in claim 19, wherein said disk is hinged at the internal surface of said tubular drum.

* * * * *